United States Patent
Kiuchi et al.

(10) Patent No.: US 8,322,592 B2
(45) Date of Patent: Dec. 4, 2012

(54) AUSTENITIC WELDING MATERIAL, AND PREVENTIVE MAINTENANCE METHOD FOR STRESS CORROSION CRACKING AND PREVENTIVE MAINTENANCE METHOD FOR INTERGRANULAR CORROSION, USING SAME

(75) Inventors: Kiyoshi Kiuchi, Naka-gun (JP); Ikuo Ioka, Naka-gun (JP); Chiaki Kato, Naka-gun (JP); Nobutoshi Maruyama, Hitachi (JP); Ichiro Tsukatani, Kobe (JP); Makoto Tanabe, Kobe (JP); Jumpei Nakayama, Kobe (JP)

(73) Assignees: Japan Atomic Energy Agency, Naka-gun (JP); Kobelco Research Institute, Inc., Kobe-shi (JP); Kabushiki Kaisha Kobe Seiko Sho, Kobe-shi (JP)

( * ) Notice: Subject to any disclaimer, the term of this patent is extended or adjusted under 35 U.S.C. 154(b) by 0 days.

(21) Appl. No.: 13/140,674

(22) PCT Filed: Dec. 16, 2009

(86) PCT No.: PCT/JP2009/070965
§ 371 (c)(1),
(2), (4) Date: Jun. 17, 2011

(87) PCT Pub. No.: WO2010/071146
PCT Pub. Date: Jun. 24, 2010

(65) Prior Publication Data
US 2011/0248071 A1    Oct. 13, 2011

(30) Foreign Application Priority Data

Dec. 18, 2008 (JP) .................. 2008-322639

(51) Int. Cl.
*B23K 31/02* (2006.01)
*B23K 35/24* (2006.01)
(52) U.S. Cl. .................. 228/119; 228/226; 228/262.41
(58) Field of Classification Search .................. None
See application file for complete search history.

(56) References Cited

U.S. PATENT DOCUMENTS 3,017,266 A * 1/1962 Murray .................. 420/47
(Continued)

FOREIGN PATENT DOCUMENTS

EP    434887 A * 7/1991
(Continued)

OTHER PUBLICATIONS

International Search Report issued Mar. 9, 2010 in PCT/JP09/070965 filed Dec. 16, 2009.

*Primary Examiner* — Kiley Stoner
(74) *Attorney, Agent, or Firm* — Oblon, Spivak, McClelland, Maier & Neustadt, L.L.P.

(57) ABSTRACT

Disclosed is an austenitic welding material which contains C: 0.01 wt % or less, Si: 0.5 wt % or less, Mn: 0.5 wt % or less, P: 0.005 wt % or less, S: 0.005 wt % or less, Ni: 15 to 40 wt %, Cr: 20 to 30 wt %, N: 0.01 wt % or less, O: 0.01 wt % or less, and the balance of Fe and inevitable impurities, wherein the content of B contained as one of the inevitable impurities in the welding material is 3 wt ppm or less, and the total content of C, P, S, N and O in the welding material is 0.02 wt % or less.

4 Claims, 4 Drawing Sheets

U.S. PATENT DOCUMENTS

| | | | |
|---|---|---|---|
| 3,151,978 A * | 10/1964 | Perry et al. | 420/46 |
| 3,306,736 A * | 2/1967 | Rundell | 420/54 |
| 3,476,555 A * | 11/1969 | Heinz et al. | 420/45 |
| 3,533,780 A * | 10/1970 | Eiji et al. | 420/42 |
| 3,764,303 A * | 10/1973 | Schmidt | 420/36 |
| 4,049,186 A * | 9/1977 | Hanneman et al. | 228/225 |
| 4,234,119 A * | 11/1980 | Masaoka et al. | 228/125 |
| 4,247,037 A | 1/1981 | Tamai et al. | |
| 4,624,402 A * | 11/1986 | Pitcairn et al. | 228/119 |
| 4,837,108 A * | 6/1989 | Kimura et al. | 420/41 |
| 4,962,586 A * | 10/1990 | Clark et al. | 29/889.2 |
| 5,022,936 A * | 6/1991 | Tsujimura et al. | 148/525 |
| 5,809,098 A * | 9/1998 | Deaver | 376/203 |
| 5,830,408 A * | 11/1998 | Azuma et al. | 420/43 |
| 6,686,061 B2 * | 2/2004 | Jeong et al. | 428/684 |
| 6,969,826 B2 * | 11/2005 | Trewiler et al. | 219/137 R |
| 7,533,795 B2 * | 5/2009 | Schaeffer et al. | 228/226 |
| 7,785,426 B2 * | 8/2010 | Tabuchi et al. | 148/325 |
| 7,862,666 B2 * | 1/2011 | Kimura et al. | 148/325 |
| 2003/0029845 A1 * | 2/2003 | Tamura et al. | 219/121.64 |
| 2003/0198567 A1 * | 10/2003 | Iseda et al. | 420/34 |
| 2004/0206427 A1 * | 10/2004 | Iseda et al. | 148/609 |
| 2004/0234408 A1 * | 11/2004 | Semba et al. | 420/49 |
| 2006/0243719 A1 * | 11/2006 | Inoue et al. | 219/146.41 |
| 2008/0240970 A1 * | 10/2008 | Eto et al. | 420/84 |
| 2008/0310990 A1 * | 12/2008 | Kimura et al. | 420/56 |
| 2009/0023506 A1 * | 1/2009 | Kondo et al. | 464/183 |
| 2010/0116382 A1 * | 5/2010 | Kiuchi et al. | 148/608 |
| 2011/0020165 A1 * | 1/2011 | Kim et al. | 420/41 |
| 2011/0042361 A1 * | 2/2011 | Nowak et al. | 219/121.64 |

FOREIGN PATENT DOCUMENTS

| | | | |
|---|---|---|---|
| EP | 1867743 A * | 12/2007 | |
| JP | 59 21711 | 5/1984 | |
| JP | 60-100629 A * | 6/1985 | |
| JP | 60-152661 A * | 8/1985 | |
| JP | 61 177325 | 8/1986 | |
| JP | 63 069947 | 3/1988 | |
| JP | 2 258190 | 10/1990 | |
| JP | 03-110097 A * | 5/1991 | |
| JP | 5 77082 | 3/1993 | |
| JP | 8 5773 | 1/1996 | |
| JP | 9 29429 | 2/1997 | |
| JP | 2000 254776 | 9/2000 | |
| JP | 2000 312969 | 11/2000 | |
| JP | 2001-107196 A * | 4/2001 | |
| JP | 2001-113388 A * | 4/2001 | |
| JP | 2001 124888 | 5/2001 | |
| JP | 2001 138048 | 5/2001 | |
| JP | 2006 183082 | 7/2006 | |
| WO | 2008 136354 | 11/2008 | |
| WO | WO 2009/078663 A * | 6/2009 | |

* cited by examiner

AUSTENITIC WELDING MATERIAL, AND PREVENTIVE MAINTENANCE METHOD FOR STRESS CORROSION CRACKING AND PREVENTIVE MAINTENANCE METHOD FOR INTERGRANULAR CORROSION, USING SAME

TECHNICAL FIELD

The present invention relates to an austenitic welding material, and a preventive maintenance method for stress corrosion cracking and a preventive maintenance method for intergranular (grain boundary) corrosion, using the welding material. In particular, the present invention relates to a welding material suitable for welding of austenitic stainless steel equipment, piping or the like, for example, in a nuclear power plant, a method for performing preventive maintenance against stress corrosion cracking of the equipment, piping or the like, using the welding material, and a method for performing preventive maintenance against intergranular corrosion of the equipment, piping or the like, using the welding material.

BACKGROUND ART

In a light-water reactor nuclear power plant, austenitic stainless steel, such as SUS 316L, SUS 304 or SUS 347, is used as a structural material for equipment, piping or the like, including a reactor pressure vessel and reactor internal components. In an operation of joining the structural materials by welding, intergranular corrosion or stress corrosion cracking is likely to occur in a heat-affected zone adjacent to a weld. The stress corrosion cracking is known as a phenomenon which occurs when an environmental condition, a stress condition and sensitization in the material are superimposed.

In this specification, the term "sensitization of austenitic stainless steel" means a phenomenon that, when the stainless steel is heated at a temperature of 450 to 800° C. for a long period of time, solid-solved carbons are precipitated as chromium carbides in grain boundaries, and thereby a region deficient in solid-solved chromium is formed in the vicinity of the grain boundaries, which causes deterioration in corrosion resistance of a steel member. After welding and joining austenitic stainless steel members together, a welding heat-affected zone between a weld toe and a base metal is sensitized due to a welding heat input.

With a view to enhancing plant reliability so as to improve a plant operating rate, various measures against the stress corrosion cracking have heretofore been studied.

For example, as measures from the viewpoint of material, there have been known a technique of reducing a carbon content in a steel member to make precipitation of chromium carbides less likely to occur, and a technique of subjecting welded members to a solution heat treatment in their entirety to improve a sensitized microstructure caused by welding and relax a welding residual stress (see, for example, the following Patent Document 1). However, these sensitization measures involve a problem that it is necessary to adjust a chemical composition of a steel member as a base metal or to perform a heat treatment after welding in a production plant, which is highly likely to lead to an increase in cost.

Further, as one example of measures from the viewpoint of welding procedure, there has been known a technique of, in an operation of joining a plurality of stainless steel or nickel-based alloy pipes by welding, welding the vicinity of each of a pair of toes of a final weld layer at a lower heat input level (see, for example, the following Patent Document 2). However, this technique is designed to modify only a welding condition in a final stage of the welding. Thus, it is undeniable that only a limited effect is expected.

As another example of the measures from the viewpoint of welding procedure, there has been known a pipe-inner-surface overlay welding (build-up welding) technique of coating a sensitized region of an inner surface of a pipe contactable with liquid, with deposited metal excellent in stress corrosion cracking resistance (see, for example, the following Patent Documents 3 to 7). However, welding heat from the overlay welding gives rise to formation of a new heat-affected zone in a base metal. For example, if the pipe is subjected to a prolonged heat treatment after the overlay welding in order to eliminate the heat-affected zone, a problem will occur that a compressive stress generated by the overlay welding declines.

As yet another example of the measures from the viewpoint of welding procedure, there have been known a water cooling technique of cooling an inner surface of a pipe by water flowing therethrough during welding, to relieve sensitization in the inner surface of the pipe and shift a welding residual stress toward a compressive side, and a technique of joining a plurality of pipe members together by welding and then subjecting an outer surface of the obtained pipe to high-frequency induction heating while cooling an inner surface of the pipe, so as to shift a residual stress in the inner surface of the pipe toward a compressive side to prevent the stress corrosion cracking (see, for example, the following Patent Document 8). However, in these techniques, the outer surface of the pipe has a residual stress in a tensile direction. Thus, in cases where the outer surface is also in contact with cooling water as in nuclear reactor internal piping, there is a problem that it is impossible to prevent the stress corrosion cracking in the outer surface.

Further, as measures to be applied to equipment, piping or the like in a currently operating nuclear plant, there has been known a repair welding technique, wherein, after removing a defective portion, a periphery of a single strapped joint attached onto a surface of the removed portion is welded and joined (claded) to a base metal (see, for example, the following Patent Document 9). However, a conventional cladding material does not have sufficient stress corrosion cracking resistance, and thereby a cladding region is likely to be sensitized.

In addition, as measures to be applied to a previously-welded pipe being used, there has been known a technique of simultaneously preventing the stress corrosion cracking in inner and outer surfaces of a pipe (the following Patent Document 10). More specifically, it is a method designed for preventive maintenance using a laser irradiation unit which is adapted to perform a rapid solidification process for forming a rapidly-solidified microstructure in an inner surface of a target member, while reducing a residual stress in an outer surface of the target member, or a solution heat treatment for reducing respective residual stresses in an inner and outer surfaces of a target member. However, due to changes in a laser irradiation power and a moving speed of a laser beam to be output from the laser irradiation unit, this technique is likely to fail to sufficiently shift a residual stress in the outer surface of a weld toward a compressive side. Moreover, if the laser irradiation power becomes excessively large, the laser irradiation is likely to cause a new sensitized region. In cases where this technique is applied to nuclear reactor internal piping, when the piping undergoes high-dose neutron irradiation during nuclear reactor operation, helium (He) produced by a nuclear reaction will be accumulated inside the piping.

Thus, there is concern that He-induced cracking occurs when a large amount of heat is applied to a weld of the piping.

The Patent Document 6 describes a stress-corrosion-cracking prevention technique, wherein, in an operation of butt-welding two stainless steel pipes, a melting/solidification process or an overlay welding process is performed in a depth range of 0.1 mm to 1.0 mm from an inner or outer surface of a base metal, to form a solidified layer. However, the solidified layer has the same chemical composition as that of the base metal. Thus, even after implementation of this technique, the welded members are still in a situation where the stress corrosion cracking resistance is intrinsically poor.

As above, the conventional stress-corrosion-cracking prevention techniques and the conventional repair techniques are just intended to: perform welding using a commercially-available welding material so as to prevent damage of a weld joint itself; coat a final layer of a weld joint with a commercially-available stress corrosion cracking-resistant alloy; clad a heat-affected zone generated in a weld joint itself, with a commercially-available cladding alloy; or re-weld a cladding region, or a portion of a weld joint including a non-welding base metal subjected to removal of cracking or other defect, using a commercially-available welding material. Newly deposited welding material itself does not have a sufficient stress corrosion cracking resistance, during a long-term plant operation, particularly, in a welded junction or the vicinity thereof, in a region having a high electrochemical potential or a region irradiated with a high neutron flux, more particularly, in a bead along a weld edge where the commercially-available welding material is diluted with a composition of the base metal. Thus, the conventional stress-corrosion-cracking prevention techniques and the conventional repair techniques have a problem of re-occurrence of the stress corrosion cracking.

Further, the use of an existing an overlay-welding material involves the following problems. Characteristics necessary for a weld joint include a stress corrosion cracking resistance of a heat-affected zone, and a cracking resistance of a deposited metal zone. It is also necessary for an overlay weld to have a cracking resistance. However, in cases where overlay welding is performed to form a multi-layer overlay weld, i.e., two or more weld layers, bending crack often occurs in a first weld layer or an underlaying weld layer. Therefore, in existing welding materials widely used for overlay welding, such as Y308 series, a composition thereof is adjusted to form δ-ferrite or the like so as to become a deposited metal improved in solidification cracking sensitivity. However, in overlay welding using the existing overlay-welding material having a composition adjusted in the above manner, a problem will occur that a corrosion resistance of a welded junction is deteriorated due to formation of δ-ferrite phase, although the cracking resistance of the welded junction is improved.

PRIOR ART DOCUMENTS

Patent Documents

Patent Document 1: JP 61-177325A
Patent Document 2: JP 9-29429A
Patent Document 3: JP 59-21711B
Patent Document 4: JP 2000-312969A
Patent Document 5: JP 2001-138048A
Patent Document 6: JP 2000-254776A
Patent Document 7: JP 2001-124888A
Patent Document 8: JP 2-258190A
Patent Document 9: JP 5-77082A
Patent Document 10: JP 8-5773A

SUMMARY OF THE INVENTION

In view of the above problems, it is an object of the present invention to provide: a welding material capable of suppressing the occurrence and development of stress corrosion cracking in a welded junction between austenitic stainless steel members, such as equipment, piping or the like, for example, in a nuclear power plant; and a method for performing preventive maintenance against stress corrosion cracking in the equipment, piping or the like, using the welding material.

According to one aspect of the present invention, there is provided an austenitic welding material which contains C: 0.01 wt % or less, Si: 0.5 wt % or less, Mn: 0.5 wt % or less, P: 0.005 wt % or less, S: 0.005 wt % or less, Ni: 15 to 40 wt %, Cr: 20 to 30 wt %, N: 0.01 wt % or less, O: 0.01 wt % or less, and the balance of Fe and inevitable impurities, wherein the content of B contained as one of the inevitable impurities in the welding material is 3 wt ppm or less, and the total content of C, P, S, N and O in the welding material is 0.02 wt % or less.

According to another aspect of the present invention, there is provided a preventive maintenance method for stress corrosion cracking of a structure formed by welding austenitic stainless steel members together. The preventive maintenance method comprises an overlay welding step of overlay-welding the above welding material to a surface of a welding heat-affected zone of the structure to form an overlay weld thereon.

According to yet another aspect of the present invention, there is provided a preventive maintenance method for stress corrosion cracking of a structure formed by welding and joining at least a first austenitic stainless steel member and a second austenitic stainless steel member. The preventive maintenance method comprises the steps of: separating the second austenitic stainless steel member used in the structure and to be replaced with a countermeasure member, from the first austenitic stainless steel member, and detaching the second austenitic stainless steel member from the structure; overlay-welding the above welding material to each of a groove surface of the countermeasure member and a groove surface of the first austenitic stainless steel member; and welding and joining the overlay-welded groove surface of the countermeasure member and the overlay-welded groove surface of the first austenitic stainless steel member.

According to still another aspect of the present invention, there is provided a preventive maintenance method for intergranular corrosion of an austenitic stainless steel structure contactable with a corrosive fluid. The preventive maintenance method comprises a step of overlay-welding the above welding material to a surface of the structure contactable with the corrosive fluid, to form an overlay weld thereon so as to prevent contact with the corrosive fluid.

These and other objects, features, aspects and advantages of the present invention will become apparent from the following detailed description and drawings.

DESCRIPTION OF EMBODIMENTS

Figure 1:
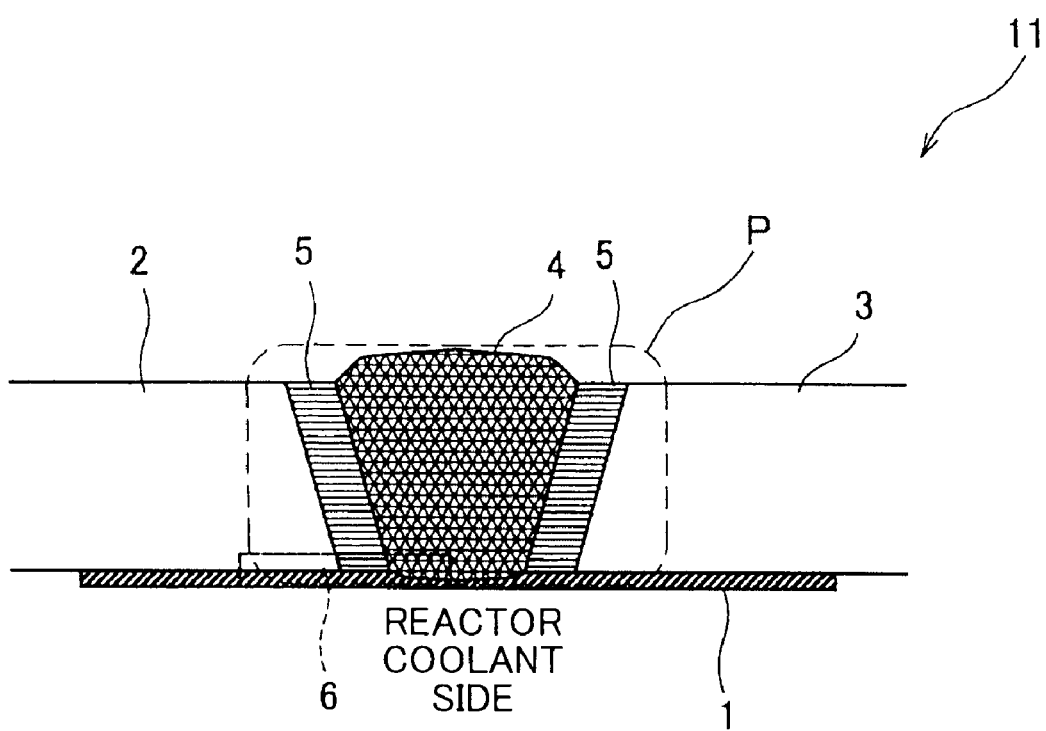
FIG. 1 is an explanatory diagram of an embodiment of a stress-corrosion-cracking preventive maintenance method according to the present invention.

In order to solve the aforementioned problems, the inventors firstly studied an influence of a content of boron (B)

added to a welding material (austenitic stainless steel) on a stress corrosion cracking resistance and an intergranular corrosion resistance.

As for the influence of the B addition on austenitic stainless steel, it is known that the B addition provides an improvement in high-temperature ductility and hot workability. For example, JP 63-69947A discloses that creep rupture ductility is improved by adding B to austenitic stainless steel in an amount of 6 to 25 ppm. It is also disclosed that, when B is added in an amount of 25 ppm, a corrosion resistance of the austenitic stainless steel is deteriorated. Further, in "Stainless steel '87", the institute of Metals, London, (1987), p. 234, it is proposed to reduce a B content in order to maintain an intergranular corrosion resistance of austenitic stainless steel, and it is reported that, when B is added in an amount of about 25 ppm, Cr borides are precipitated in grain boundaries even in a typical solution heat treatment, to cause deterioration in the intergranular corrosion resistance. In "Materials and Processes", Iron and Steel, Vol. 6 (1993), p. 732, it is reported that it is necessary to reduce a B content to 9 ppm or less to maintain an intergranular corrosion resistance of austenitic stainless steel at a high level.

In view of the above reports, it is assumed that, in steel having a conventional impurity level, when a B content becomes greater than 10 ppm in cases where an addition of B is less likely to have adverse effects, deterioration in intergranular corrosion resistance starts appearing. However, through researches, the inventors found out that, even if the B content is set to 5 ppm or more, it is impossible to fully avoid stress corrosion cracking in a weld under a high-temperature/high-pressure underwater environment undergoing neutron irradiation, and transpassive corrosion under a corrosive environment between a boiling heat transfer surface and a high-concentration nitric acid solution including a highly-acid ion. Then, the inventors acquired knowledge that, as a prerequisite to improving a stress corrosion cracking resistance and an intergranular corrosion resistance under the above environments, it is critical to further reduce the B content. As a result of further researches, the inventors found out that, while a solid solubility limit of B in austenitic stainless steel is assumed to be about 10 ppm, a significant improvement in grain-boundary damage is observed even when the B content is less than the solid solubility limit, and acquired knowledge that a development of intergranular corrosion is not caused by formation of borides but by B itself solid-solved in grain boundaries.

Further, the inventors studied factors causing stress corrosion cracking and intergranular corrosion in a weld formed by performing multi-layer overlay welding, under a high-temperature/high-pressure underwater environment undergoing neutron irradiation and under a corrosive environment between a boiling heat transfer surface and a high-concentration nitric acid solution including a highly-acid ion. As a result, the inventors acquired knowledge that, in typical welding, a heat-affected zone (welding heat-affected zone in a base metal) is sensitized, whereas, in two-layer or multi-layer overlay welding, an overlay weld is sensitized to stress corrosion cracking and intergranular corrosion, because Cr-based carbides are precipitated in grain boundaries of the overlay weld as well as the base metal, under an influence of heat from subsequent bead welding or the like, and thereby, if the B content is 5 ppm or more, it becomes impossible to fully avoid the stress corrosion cracking under a high-temperature/high-pressure underwater environment undergoing neutron irradiation, and the transpassive corrosion under a corrosive environment between a boiling heat transfer surface and a high-concentration nitric acid solution including a highly-acid ion. The inventors also acquired knowledge that, particularly when overlay welding is performed using an existing welding material (commercially-availabe welding material), welded members are further sensitized.

Therefore, the inventors considered that, under a high-temperature/high-pressure underwater environment undergoing neutron irradiation and under a corrosive environment between a boiling heat transfer surface and a high-concentration nitric acid solution including a highly-acid ion, a stress corrosion cracking resistance and an intergranular corrosion resistance of a welded junction might be improved by employing a welding material prepared by maximally removing impurity elements, such as boron (B) and carbon (C), which can be segregated in grain boundaries to cause a decrease in grain boundary energy. Then, the inventors checked a stress corrosion cracking resistance and an intergranular corrosion resistance of a welded junction under the two environments, by preparing an austenitic welding material which contains C: 0.01 wt % or less, Si: 0.5 wt % or less, Mn: 0.5 wt % or less, P: 0.005 wt % or less, S: 0.005 wt % or less, Ni: 15 to 40 wt %, Cr: 20 to 30 wt %, N: 0.01 wt % or less, O: 0.01 wt % or less, and the balance of Fe and inevitable impurities, wherein the content of B contained as one of the inevitable impurities is 3 wt ppm or less, and the total content of C, P, S, N and O is 0.02 wt % or less, and overlay-welding the welding material to a butt weld. In an evaluation test performed by using each of the above austenitic welding material and an existing welding material as a welding material for butt welding, the inventors found out that the above austenitic welding material provides a significant improvement in stress corrosion cracking resistance and intergranular corrosion resistance of a welded junction, as compared with the existing welding material. Based on this knowledge, the present invention has been accomplished.

With reference to the drawings, the present invention will be specifically described based on various embodiments thereof. It is to be understood that the following embodiments are in no way intended to limit the present invention.

[Welding Material]

One embodiment of an austenitic welding material according to the present invention contains C: 0.01 wt % or less, Si: 0.5 wt % or less, Mn: 0.5 wt % or less, P: 0.005 wt % or less, S: 0.005 wt % or less, Ni: 15 to 40 wt %, Cr: 20 to 30 wt %, N: 0.01 wt % or less, O: 0.01 wt % or less, and the balance of Fe and inevitable impurities, wherein the content of B contained as one of the inevitable impurities in the welding material is 3 wt ppm or less, and the total content of C, P, S, N and O in the welding material is 0.02 wt % or less.

(Metal Structure of Welding Material)

A metal structure of the welding material in this embodiment comprises austenite (austenitic structure), at normal temperature and normal pressure (25° C., 1 atm). An austenitic welding material having a low amount of impurity elements such as B and C (i.e., highly-purified austenitic welding material) has a narrow temperature range of liquid-solid phase coexistence, and thereby a level of thermal diffusion to an edge of a weld is low, as compared with an austenitic welding material having a large amount of impurity elements. Thus, in welding using the welding material of this embodiment, a temperature rise of a base metal can be suppressed to a low level, so that it becomes possible to narrow a welding heat-affected zone, i.e., a sensitized zone. Further, in welding using the welding material of this embodiment, solidification of a weld will be promptly completed. Thus, a thermal shrinkage of the weld with respect to a base metal region becomes larger, and the weld is placed in a compressive residual stress state. This makes it possible to improve a stress corrosion cracking resistance. Preferably, the metal structure of the welding material of this embodiment consists only of austenite.

(Chemical Composition of Welding Material)

The reasons for setting a composition of the austenitic welding material of this embodiment will be described below.

C: 0.01 wt % or less

Carbon (C) is an element which causes Cr-base carbides to be precipitated in grain boundaries during heating. Based on the precipitation, a Cr-deficient region is formed around the carbide, which causes deterioration in nitric-acid corrosion resistance and stress corrosion cracking resistance in grain boundaries. Thus, it is desirable to minimize a C content in the welding material. Considering industrial practicality of a dissolution process and others, the C content is set to 0.01 wt % or less.

Si: 0.5 wt % or less

Silicon (Si) is an element which allows a nitric acid resistance of a welding material to be improved when it is added to the welding material within several wt %. However, in view of suppressing grain-boundary damage, it is desirable to minimize a Si content in the welding material. On the other hand, a certain amount of Si is effective as an oxygen enrichment inhibitor for a molten material pool. Thus, the Si content is set to 0.5 wt % or less.

Mn: 0.5 wt % or less

Manganese (Mn) is an element capable of enhancing stability of an austenite phase, and preventing formation of δ-ferrite harmful to a corrosion resistance, and processing-induced phase transformation. However, if a Mn content in the welding material becomes greater than 0.5 wt %, the δ-ferrite formation and processing-induced phase transformation preventing effect of Mn is saturated. Rather, a large amount of Mn solid-solved in an austenite phase promotes the corrosion. Thus, the Mn content is set to 0.5 wt % or less.

P: 0.005 wt % or less

Phosphorus (P) is known as an element having a property of being segregated in grain boundaries. As a P content in the welding material is increased, the stress corrosion cracking resistance and intergranular corrosion resistance in grain boundaries become deteriorated. Thus, it is desirable to minimize the P content. Practically, the P content is set to 0.005 wt % or less.

S: 0.005 wt % or less

Sulfur (S) is an element which causes formation of a sulfide in a welding material. As an S content in the welding material is increased, the formation of sulfides is further promoted. Consequently, due to selective corrosion triggered by the sulfides, the stress corrosion cracking resistance, the intergranular corrosion resistance and a pitting corrosion of the welding material become deteriorated. Thus, it is desirable to minimize the S content. Practically, the S content is set to 0.005 wt % or less.

Ni: 15 to 40 wt %

Nickel (Ni) is an element necessary for stabilizing austenite of the welding material and suppressing the stress corrosion cracking and intergranular corrosion. However, if a Ni content in the welding material is less than 15 wt %, it becomes impossible to ensure austenite in the metal structure in an amount enough to suppress the stress corrosion cracking and intergranular corrosion, and obtain a swelling resistance under a neutron irradiation environment. On the other hand, if the Ni content becomes greater than 40 wt %, a raw material cost of the welding material is increased. Thus, the Ni content is set in the range of 15 to 40 wt %.

Cr: 20 to 30 wt %

Chromium (Cr) is an element necessary for forming a passive film on a surface of a welding material to ensure the corrosion resistance. In view of the formation of a passive film, a Cr content in the welding material may be about 16 wt % as in SUS 304 and SUS 316 series stainless steels which are representative stainless steels in the Japanese Industrial Standards (JIS). However, as a prerequisite to allowing the welding material to ensure a sufficient corrosion resistance under a high-temperature/high-pressure underwater environment undergoing neutron irradiation, as in a core of a light-water nuclear reactor, and under a transpassive corrosion environment between a boiling heat transfer surface and a high-concentration nitric acid solution including a highly-acid ion, as in a reprocessing plant, it is necessary to set the Cr content to at least 20 wt %. On the other hand, if the Cr content becomes greater than 30 wt %, a Cr-rich brittle phase is precipitated in the welding material. In this case, it is necessary to increase the Ni content in order to avoid the precipitation of the brittle phase to form the welding material into pure austenite. However, this leads to an increase in raw material cost of the welding material. Thus, the Cr content is set in the range of 20 to 30 wt %.

N: 0.01 wt % or less

O: 0.01 wt % or less

Each of nitrogen (N) and oxygen (O) is an element which causes deterioration in the stress corrosion cracking resistance and intergranular corrosion resistance. Thus, it is desirable to minimize each of a N content and an O content in the welding material. Practically, each of the N content and the O content is set to 0.01 wt % or less.

B: 3 wt ppm or less

Boron (B) in the welding material is fundamentally an impurity element having a property of being segregated in brain boundaries to cause deterioration in the stress corrosion cracking resistance and intergranular corrosion resistance. Thus, it is desirable to minimize a B content in the welding material.

The B content is one most important factor having an impact on the intergranular corrosion resistance and stress corrosion cracking resistance of the welding material in this embodiment. A success factor in allowing the inventors to acquire the knowledge about the advantageous effect of reducing the content of B to an extremely small value largely depends on progress in analysis device/technique and steel-making technique. A detection limit in conventional analyses was about 2 wt ppm. However, based on progress in GD-MS techniques, it has become possible to accurately analyze the B content at a level of 1 wt ppm or less, and allow the inventors to clarify a relationship between an extremely small amount of B and the stress corrosion cracking resistance/intergranular corrosion resistance through their researches. More specifically, in the conventional analysis techniques, it is impossible to determine the B content at a level of 0.0003 wt % or less. Therefore, the inventors have fully utilized recent analysis techniques successfully so as to clarify a relationship between a lower B content and the corrosion resistance, and finally found that the stress corrosion cracking resistance and intergranular corrosion resistance can be sufficiently suppressed when the B content is set to 0.0003 wt % or less. Thus, the B content is set to 3 wt ppm (0.0003 wt %) or less, preferably 1.5 wt ppm or less.

In typical casting of austenitic stainless steel, B is mixed therein from raw materials, such as ferrous alloy and scrap, so that an obtained ingot inevitably has a B content of about 2 to 5 wt ppm. However, based on the progress in analysis techniques, it has become possible to select a raw material having a low B content. Further, based on the progress in steel making techniques, such as oxidation refining, it has become possible to perform casting of steel having a low B content (so-called "low-B steel").

C+P+S+O+N: 0.02 wt % or less

Although respective contents of C, P, S, O and N as impurity elements are limited individually, the welding material does not exhibit adequate stress corrosion cracking resistance and intergranular corrosion resistance, if the total content of the elements is greater than 0.02 wt %. While the above elements are different from each other in terms of an effect on grain boundaries (influence on the stress corrosion cracking resistance and intergranular corrosion resistance) and a mechanism for forming a deposit, current analysis/evaluation techniques are incapable of distinguishing respective present states of the elements each having an extremely small amount, individually. However, it can be inferred that the impurity elements segregated/solid-solved in grain boundaries definitely have a negative effect. Thus, it is desirable to minimize a sum of the contents of the elements. Specifically, the sum of the C, P, S, N and O contents in the welding material is set to 0.02 wt % or less.

Ti: being equal to or greater than the total content of C, P, S, N and O in terms of Ti equivalent Although it is desirable to minimize impurity elements more likely to be segregated in grain boundaries, such as C, P, S, N and O, complete removal of the impurity elements is hardly achieved by current refining techniques, and is not an economical approach. In a production process of the welding material of this embodiment, a content of impurity elements such as C, P, S, N and O is already reduced to an extremely low level in an ingot stage. However, the inventors found out that impurity elements which cannot be fully removed by a dissolution process on a commercial basis and contained in an extremely small amount have a negative effect on the intergranular corrosion.

As measures against this problem, it is effective to add an element capable of allowing the above impurity elements to become harmless to the stress corrosion cracking and intergranular corrosion, preferably, add Ti. In a process of producing the welding material in this embodiment on a commercial basis, it is preferable to add Ti so as to allow impurity elements causing the intergranular corrosion, such as C, P, S, N and O, to be precipitated in a deposited metal in the form of Ti-based carbides, Ti-based phosphides, Ti-based sulfides, Ti-based nitrides, Ti-based oxides and other Ti-based compounds, such as TiC, FeTiP, TiS, TiN and $TiO_2$, to render the impurity elements harmless to the stress corrosion cracking and intergranular corrosion.

Preferably, a Ti content is equal to or greater than an amount required for allowing all of C, P, S, N and O in the welding material to be precipitated in a deposited metal by welding in the form of Ti-based carbides, Ti-based phosphides, Ti-based sulfides, Ti-based nitrides, Ti-based oxides and other Ti-based compounds, such as TiC, FeTiP, TiS, TiN and $TiO_2$. More specifically, it is preferable that the Ti content is equal to or greater than a sum of a C content in terms of Ti equivalent (a Ti content stoichiometrically equal to a carbon content in the welding material), a P content in terms of Ti equivalent, a S content in terms of Ti equivalent, a N content in terms of Ti equivalent and an O content in terms of Ti equivalent. In other words, it is preferable to satisfy the following formula (1):

$$[Ti] \geq (48/12) \times [C] + (48/31) \times [P] + (48/32) \times [S] + (48/14) \times [N] + (48/16) \times (1/2) \times [O] \quad (1)$$

(where [Ti], [C], [P], [S], [N] and [O] represent respective contents of Ti, C, P, S, N and O (wt %)).

More preferably, in view of dynamic precipitation response of a dilute element in the welding metal, the Ti content is set to 0.05 wt % or more. On the other hand, excessive addition leads to an increase in raw material cost of the welding material. Thus, it is preferable to set the Ti content to 0.3 wt % or less.

[Stress-Corrosion-Cracking Preventive Maintenance Method]

With reference to FIG. 1, one embodiment of a stress-corrosion-cracking preventive maintenance method according to the present invention will be described. FIG. 1 is an explanatory diagram of an embodiment of a stress-corrosion-cracking preventive maintenance method according to the present invention, specifically, a sectional view of a weld joint test member, which schematically illustrates an overlay weld 1 formed by overlay-welding the welding material in the above-mentioned embodiment to a surface of a welded junction P contactable with nuclear reactor coolant (on the side of reactor coolant), during welding of SUS 304 stainless steel (austenitic stainless steel) piping for use in a nuclear reactor plant).

In nuclear reactor internal piping made of austenitic stainless steel and subjected to welding and joining, stress corrosion cracking is likely to occur during use of the piping, due to a sensitized area formed in a welding heat-affected zone 5 on both sides of a weld metal 4. In this embodiment, as illustrated in FIG. 1, in the above piping which is a structure prepared by butt-welding two austenitic stainless steel members 2, 3 together, using Y308 which is a commercially-available welding material, the welding material in the above-mentioned embodiment is overlay-welded to a reactor coolant-side surface of the welded junction P and a base metal, to form an overlay weld 1 thereon. The overlay weld 1 entirely covers the welded junction P including the welding heat-affected zone 5, so that it becomes possible to effectively prevent the occurrence and development of stress corrosion cracking in the piping.

Thus, the stress-corrosion-cracking preventive maintenance method in this embodiment makes it possible to effectively prevent the occurrence and development of stress corrosion cracking in the welded junction P of the piping for use in a nuclear reactor plant.

FIG. 2 is an explanatory diagram of another embodiment of the stress-corrosion-cracking preventive maintenance method according to the present invention, specifically, a sectional view schematically illustrating a pipe 21 and a pipe 31 each overlay-welded with the welding material in the above-mentioned embodiment.

Figure 2A:
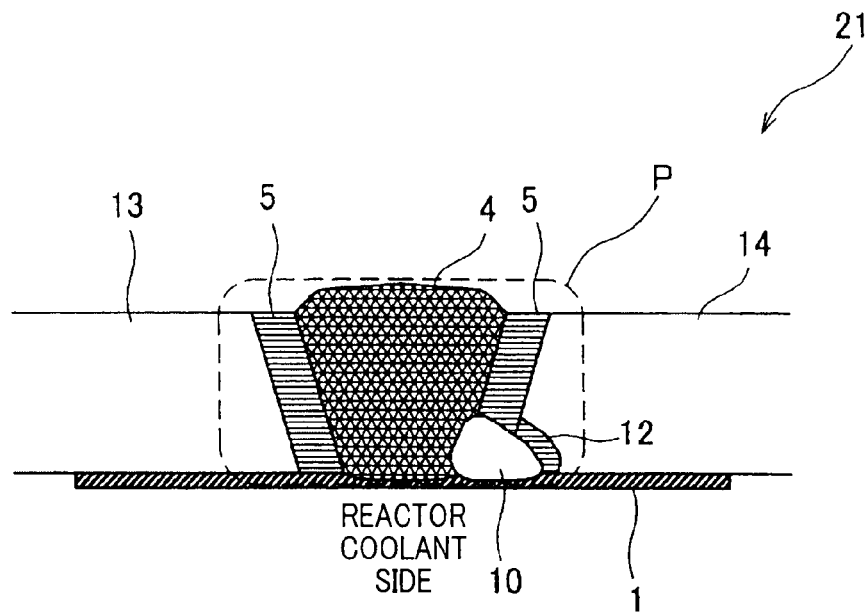
FIG. 2 is an explanatory diagram of another embodiment of the stress-corrosion-cracking preventive maintenance method according to the present invention.

With reference to FIG. 2A, another embodiment of the stress-corrosion-cracking preventive maintenance method according to the present invention will be described. FIG. 2A is a sectional view schematically illustrating a situation where a plurality of austenitic stainless steel members such as SUS 304 stainless steel pipe members (pipe members 13, 14) are welded and joined together, and exposed to nuclear reactor coolant within a nuclear reactor whereafter, when a defect such as intergranular corrosion or stress corrosion cracking, the defective portion is removed and repair-welded, and then overlay welding is performed using the welding material in the above-mentioned embodiment.

In the stress-corrosion-cracking preventive maintenance method according to this embodiment, a defective portion existing in the welded junction P is removed, and then repair welding is performed using the same Y308 as that during the butt welding (to form a repair portion 10). Subsequently, overlay welding is performed using the welding material in the above-mentioned embodiment to coat the heat-affected zone 5, the weld metal 4, the repair portion 10 and a new heat-affected zone 12. In other words, based on overlay welding using the welding material in the above-mentioned embodiment, both the heat-affected zone 5 and the new heat-affected zone 12 in the welded junction P are coated with the overlay weld 1. This makes it possible to effectively prevent the occurrence and development of stress corrosion cracking not only in the heat-affected zone 5 but also in the repair-welded portion (repair portion 10) and the heat-affected zone 12 caused by the repair welding.

Figure 2B:
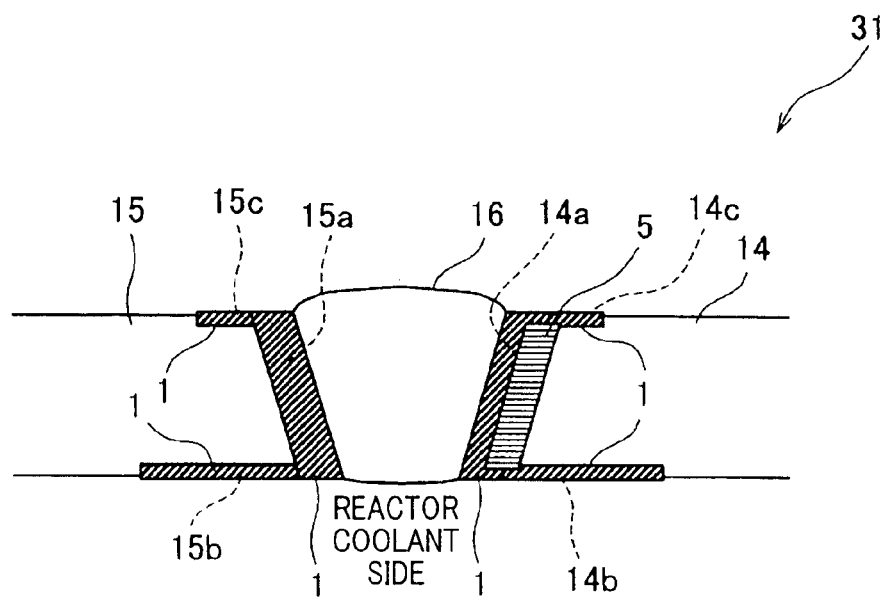

With reference to FIG. 2B, another embodiment of the stress-corrosion-cracking preventive maintenance method according to the present invention will be described below. FIG. 2B is a sectional view schematically illustrating a situation where, when a defect such as intergranular corrosion or stress corrosion cracking is found in the pipe member 13 (austenitic stainless steel pipe) illustrated in FIG. 2A, due to exposure to nuclear reactor coolant within a nuclear reactor, the defective pipe member 13 is replaced with a countermeasure member 15.

In the stress-corrosion-cracking preventive maintenance method according to this embodiment, the pipe member 13 (which is a second austenitic stainless steel member) is firstly separated from the pipe member 14 (which is a first austenitic stainless steel member) joined to the pipe member 13. Then, the countermeasure member 15 made of the same material (SUS 304 stainless steel) as that of the pipe member 13 is prepared as a substitute for the pipe member 13 from which a defect is found, and the welding material in the above-mentioned embodiment is overlay-welded to a groove surface 15a of the countermeasure member 15 and two pipe surfaces 15b, 15c of the countermeasure member 15 adjacent to the groove surface 15a. In the same manner, the welding material in the above-mentioned embodiment is overlay-welded to a groove surface 14a of the pipe member 14 and two pipe surfaces 14b, 14c of the pipe member 14 adjacent to the groove surface 14a. Subsequently, the countermeasure member 15 and the pipe member 14 are butt-welded together using the welding material Y308. In this case, each of the pipe surface 15b and the pipe surface 14b is a reactor coolant-side surface of a respective one of the countermeasure member 15 and the pipe member 14, and each of the pipe surface 15c and the pipe surface 14c is a surface of a respective one of the countermeasure member 15 and the pipe member 14 on an opposite side of the reactor coolant-side surface. As for an area of an overlay weld formed on each of inner and outer surfaces of a pipe using the welding material in the above-mentioned embodiment, a reactor coolant-side one of the surfaces is greater than the other surface.

Before butt-welding the countermeasure member 15 and the pipe member 14, the welding material in the above-mentioned embodiment is overlay-welded to the groove surfaces. Thus, during the butt welding, it becomes possible to suppress sensitization which would otherwise occur in the countermeasure member 15 and the pipe member 14 due to the butt-welding. This makes it possible to effectively prevent the occurrence and development of stress corrosion cracking or the like.

[Intergranular-Corrosion Preventive Maintenance Method]

FIG. 3 is an explanatory diagram of an intergranular-corrosion preventive maintenance method according to the present invention.

Figure 3A:
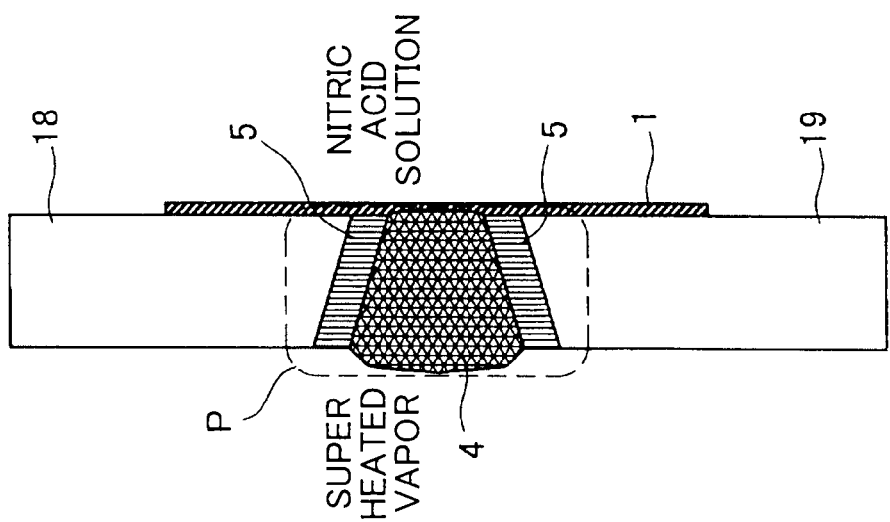
FIG. 3 is an explanatory diagram of an embodiment of an intergranular-corrosion preventive maintenance method according to the present invention.

With reference to FIG. 3A, an embodiment of an intergranular-corrosion preventive maintenance method according to the present invention will be described. FIG. 3A is a sectional view illustrating an overlay weld 1 formed by overlay-welding the welding material in the above-mentioned embodiment to a surface of a SUS 304 stainless steel component 17 contactable with a corrosive fluid (nitric acid solution). The component 17 is an austenitic stainless steel structure formed by welding a plurality of austenitic stainless steel members together and to be used under a corrosive environment between a boiling heat transfer surface and a high-concentration nitric acid solution including a highly-acid metal ion, in a spent nuclear fuel-reprocessing plant.

As shown in FIG. 3A, in this embodiment, the welding material in the above-mentioned embodiment is overlay-welded to the entire liquid-contacting surface of the component 17 on the side of the nitric acid solution, to form an overlay weld 1 thereon. The overlay weld 1 keeps the nitric acid solution from coming into direct contact with the liquid-contacting surface of the component 17, so that it becomes possible to effectively prevent the intergranular corrosion of the component 17.

Figure 3B:
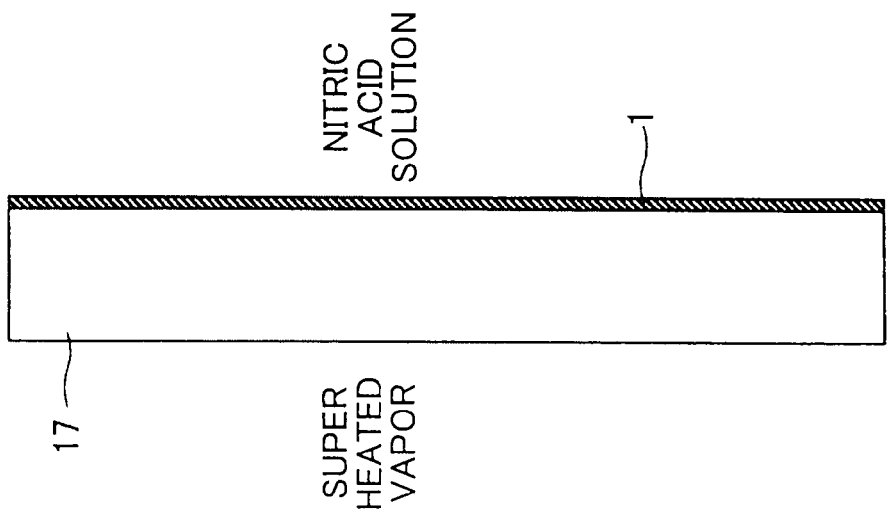

With reference to FIG. 3B, another embodiment of an intergranular-corrosion preventive maintenance method according to the present invention will be described below. FIG. 3B is a sectional view illustrating a welded junction P of a component formed by welding two SUS 304 stainless steel members 18, 19 together, wherein an overlay weld 1 is formed by overlay-welding the welding material in the above-mentioned embodiment to a (liquid-contacting) surface of the welded junction P contactable with a corrosive fluid (nitric acid solution) and the vicinity of the welded junction P.

As with the component 17, the above component is an austenitic stainless steel structure formed by welding the austenitic stainless steel members and to be used under a corrosive environment between a boiling heat transfer surface and a high-concentration nitric acid solution including a highly-acid metal ion, in a spent nuclear fuel-reprocessing plant.

As shown in FIG. 3B, in this embodiment, the overlay welding is performed to coat respective liquid-contacting surfaces of a weld metal 4, a heat-affected zone 5 and the vicinity of the heat-affected zone 5 of the component on the side of the nitric acid solution, with the welding material in the above-mentioned embodiment. In other words, based on overlay welding using the welding material in the above-mentioned embodiment, one surface (liquid-contacting surface) of the welded junction P is coated with the overlay weld 1. The overlay weld 1 keeps the nitric acid solution from coming into direct contact with the liquid-contacting surface of the welded junction P of the component, so that it becomes possible to effectively prevent the intergranular corrosion of the welded junction P.

In FIGS. 1 to 3, a heat-affected zone caused by the overlay welding using the welding material in the above-mentioned embodiment is not illustrated in the base metal. The reason is as follows. The welding material in the above-mentioned embodiment is formed to have a sufficiently low content of impurity elements, such as B and C (i.e., highly purified), so that it has a narrow temperature range of liquid-solid phase coexistence, and thereby a level of thermal diffusion to an edge of the overlay weld is low, as mentioned above. Therefore, a temperature rise of the base metal can be reduced to a lower level, and thus a heat-affected zone, i.e., a sensitized zone, is significantly narrow.

Although specific embodiments of the present invention have been described, the present invention is not limited to the above embodiments, but various changes and modifications may be made therein within a technical scope of the present invention as defined in the appended claims, as follows.

The stress-corrosion-cracking preventive maintenance method according to one of the above embodiments has been described based on one example where the overlay weld 1 is formed on the entire reactor coolant-side surface of the welded junction P. Alternatively, the overlay weld 1 may be formed by overlay welding, to cover at least the welding heat-affected zone (sensitize zone) where the stress corrosion cracking or intergranular corrosion is most likely to occur, in the welded junction P.

The stress-corrosion-cracking preventive maintenance method according one of the above embodiments has been described based on one example where each of the first and second austenitic stainless steel members to be butt-welded together is made of SUS 304 stainless steel. Alternatively, any other suitable austenitic stainless steel, such SUS 316 or SUS 316L, may be employed as a material for one or both of the first and second austenitic stainless steel members.

The stress-corrosion-cracking preventive maintenance method according one of the above embodiments has been described based on one example where the commercially-available Y308 is employed as a welding material for butt welding. Alternatively, any other suitable welding material for austenitic stainless steel members may be employed as the welding material for butt welding. In this case, it is more preferable to employ the welding material according to the present invention. In cases where the welding material according to the present invention is employed, the weld metal 4 can exhibit a sufficient stress corrosion cracking resistance, so that only the welding heat-affected zone 5 and the vicinity thereof may be overlay-welded with the welding material according to the present invention.

The stress-corrosion-cracking preventive maintenance method according to one of the above embodiments has been described based on one example where the method is applied to welding for SUS 304 stainless steel piping for use in a nuclear power plant. Alternatively, it may be applied to welding for any other suitable austenitic stainless steel piping, such as SUS 304 stainless steel piping for use in a chemical plant, or may be applied to welding for a component as well as piping.

The stress-corrosion-cracking preventive maintenance method according to one of the above embodiments has been described based on one example where the overlay weld 1 is formed on only one of opposite surfaces of the welded junction P contactable with nuclear reactor coolant (on the side of reactor coolant). Alternatively, the overlay weld 1 is formed on the other surface of the welded junction P, or may be formed on each of the opposite surfaces.

The stress-corrosion-cracking preventive maintenance method according to one of the above embodiments has been described based on one example where repair welding is performed using Y308 which is an existing welding material. Alternatively, the welding material according to the present invention may be employed as a welding material for the repair portion 10. In this case, it becomes possible to prevent the occurrence of a new heat-affected zone 12, and improve an intergranular corrosion resistance and a stress corrosion cracking resistance of the repair portion 10 itself. Further, in the stress-corrosion-cracking preventive maintenance method according to this embodiment, as a welding material for butt welding between the pipe member 13 and the pipe member 14, any suitable existing welding material other than Y308 may be employed, or the welding material according to the present invention may be employed.

The stress-corrosion-cracking preventive maintenance method according to one of the above embodiments has been described based on one example where a SUS 304 stainless steel member is employed as the countermeasure member. Alternatively, any other suitable austenitic stainless steel member, such as a SUS 316 stainless steel member or SUS 316 L stainless steel member, may be employed.

The stress-corrosion-cracking preventive maintenance method according to one of the above embodiments has been described based on one example where butt welding between the countermeasure member 15 and the pipe member 16 is performed using Y308 which is an existing welding material. Alternatively, as the welding material for the butt welding, any suitable existing welding material other than Y308 may be employed, or the welding material according to the present invention may be employed. It is preferable to employ the welding material according to the present invention, because it improves an intergranular corrosion resistance and a stress corrosion cracking resistance of the weld metal 16 itself.

The intergranular-corrosion preventive maintenance method according to one of the above embodiments has been described based on one example where a structure prepared by welding a plurality of austenitic stainless steel members together is comprised of the component 17. Alternatively, the structure prepared by welding a plurality of austenitic stainless steel members together may be any other structure, such as nuclear reactor internal piping.

EXAMPLE

Although the present invention will be more specifically described based on an example, it will be understood that the following examples are not intended to limit the present invention, but may be implemented with appropriate changes and modifications made to the extent of meeting the spirit in the above and following descriptions, which may be included within a technical scope of the present invention as defined by the appended claims.

(Preparation of Welding Material)

A plurality of types of welding materials Nos. A to L were prepared in the following manner. Firstly, 150 Kg of steel as a raw material of each of the welding materials Nos. A to L was subjected to a vacuum induction melting (VIM) process, and poured into a mold in vacuum to obtain an ingot for each of the welding materials. Then, an electrode was cut out from each of the ingots, and subjected to an electron beam re-melting (EB) process to obtain a columnar ingot. Then, the columnar ingot was subjected to a forging process and a wiredrawing process to obtain a welding rod having a diameter of 2.4 mmϕ. Table 1 illustrates respective chemical compositions of the welding materials Nos. A to L. In Table 1, a unit of each element is "weight percent" (wt %), except for "weight parts per million" (wt ppm) for B.

TABLE 1

| Welding Material No. | C (%) | Si (%) | Mn (%) | P (%) | S (%) | Ni (%) | Cr (%) | Ti (%) | B (ppm) | N (%) | O (%) |
| --- | --- | --- | --- | --- | --- | --- | --- | --- | --- | --- | --- |
| A | 0.001 | 0.02 | 0.05 | 0.002 | 0.001 | 20.4 | 24.2 | 0.20 | 0.2 | 0.0025 | 0.0022 |
| B | 0.002 | 0.04 | 0.04 | 0.001 | 0.001 | 20.8 | 23.9 | 0.19 | 1.3 | 0.0019 | 0.0032 |
| C | 0.001 | 0.06 | 0.06 | 0.002 | 0.002 | 21.4 | 24.5 | 0.22 | 2.5 | 0.0028 | 0.0030 |
| D | 0.001 | 0.02 | 0.05 | 0.001 | 0.001 | 19.2 | 24.7 | 0.20 | 4.2 | 0.0037 | 0.0024 |
| E | 0.001 | 0.05 | 0.08 | 0.003 | 0.001 | 10.2 | 18.5 | 0.19 | 0.7 | 0.0032 | 0.0031 |
| F | 0.001 | 0.06 | 0.06 | 0.004 | 0.001 | 21.6 | 32.1 | 0.22 | 0.6 | 0.0027 | 0.0037 |

TABLE 1-continued

| Welding Material No. | C (%) | Si (%) | Mn (%) | P (%) | S (%) | Ni (%) | Cr (%) | Ti (%) | B (ppm) | N (%) | O (%) |
|---|---|---|---|---|---|---|---|---|---|---|---|
| G | 0.002 | 0.07 | 0.07 | 0.001 | 0.001 | 35.3 | 25.2 | 0.18 | 1.6 | 0.0033 | 0.0025 |
| H | 0.002 | 0.04 | 0.08 | 0.002 | 0.002 | 20.9 | 24.4 | 0.02 | 0.4 | 0.0026 | 0.0043 |
| I | 0.016 | 0.03 | 0.12 | 0.003 | 0.003 | 21.1 | 24.8 | 0.21 | 0.8 | 0.0025 | 0.0023 |
| J | 0.003 | 0.74 | 0.11 | 0.002 | 0.001 | 35.2 | 25.7 | 0.02 | 0.7 | 0.0039 | 0.0055 |
| K | 0.002 | 0.05 | 2.21 | 0.003 | 0.002 | 34.7 | 25.1 | 0.18 | 1.5 | 0.0088 | 0.0043 |
| L | 0.002 | 0.01 | 0.05 | 0.016 | 0.017 | 20.7 | 24.5 | 0.01 | 1.0 | 0.0027 | 0.0039 |

In Table 1, each of the welding materials Nos. A to C, G and H is the austenitic welding material according to the present invention (inventive example), wherein: a C content is 0.01 wt % or less; a Si content is 0.5 wt % or less; a Mn content is 0.5 wt % or less; a P content is 0.005 wt % or less; a S content is 0.005 wt % or less; a Ni content is in a range of 15 to 40 wt %; a Cr content is in a range of 20 to 30 wt %; a N content is 0.01 wt % or less; an O content is 0.01 wt % or less; and a B content is 3 wt ppm or less, wherein the total content of C, P, S, N and O is 0.02 wt % or less. Further, the welding material No. D is a comparative example in which the B content is greater than 3 wt ppm. The welding material No. E is a comparative example in which the Ni content is less than 20 wt %, and the Cr content is less than 20 wt %. The welding material No. F is a comparative example in which the Cr content is greater than 30 wt %. The welding material No. I is a comparative example in which the C content is greater than 0.01 wt %. The welding material No. J is a comparative example in which the Si content is greater than 0.5 wt %. The welding material No. K is a comparative example in which the Mn content is greater than 0.5 wt %. The welding material No. L is a comparative example in which the P content is greater than 0.005 wt %, and the S content is greater than 0.005 wt %. In each of the welding materials Nos. I, K and L as comparative examples, the total content of C, P, S, N and O is greater than 0.002 wt %.

(Crevice Corrosion Stress Cracking Test (CBB Test))

A CBB test simulating a stress corrosion environment in an inner surface of a pipe inside a nuclear reactor was performed in the following manner.

Firstly, a weld joint test member for overlay welding using each of the welding materials Nos. A to L was prepared. More specifically, the weld joint test member was obtained by butting two SUS 304 stainless steel plate members each having a size of 12 mm thickness×100 mm width×300 mm length, against each other, and subjecting the plate members to TIG-welding using Ar as a shield gas at a flow rate of 20 L/min, while using Y308 as a welding material. Conditions of the TIG-welding were set as follows: wire diameter=2.4 mm; welding current=180A; welding voltage=9V; welding speed=100 mm/min; and wire feed rate=100 cm/min.

Then, each of the welding materials Nos. A to L was overlay-welded to a welded junction of the weld joint test member. FIG. 1 is a sectional view illustrating the weld joint test member 11 in which a butt weld of plate members 2, 3 is overlay-welded with an austenitic welding material 1. As shown in FIG. 1, in imitation of an inner surface of nuclear reactor inner piping, overlay welding was performed using the austenitic welding material 1 to coat respective back bead-side (reactor coolant-side) surfaces of a heat-affected zone 5 and a weld metal 4 (each formed by butt welding using Y308 as a welding material) in a welded junction P of the weld joint test member 11 (so as to keep the heat-affected zone 5 and the weld metal 4 from coming into direct contact with reactor coolant).

Figure 4:
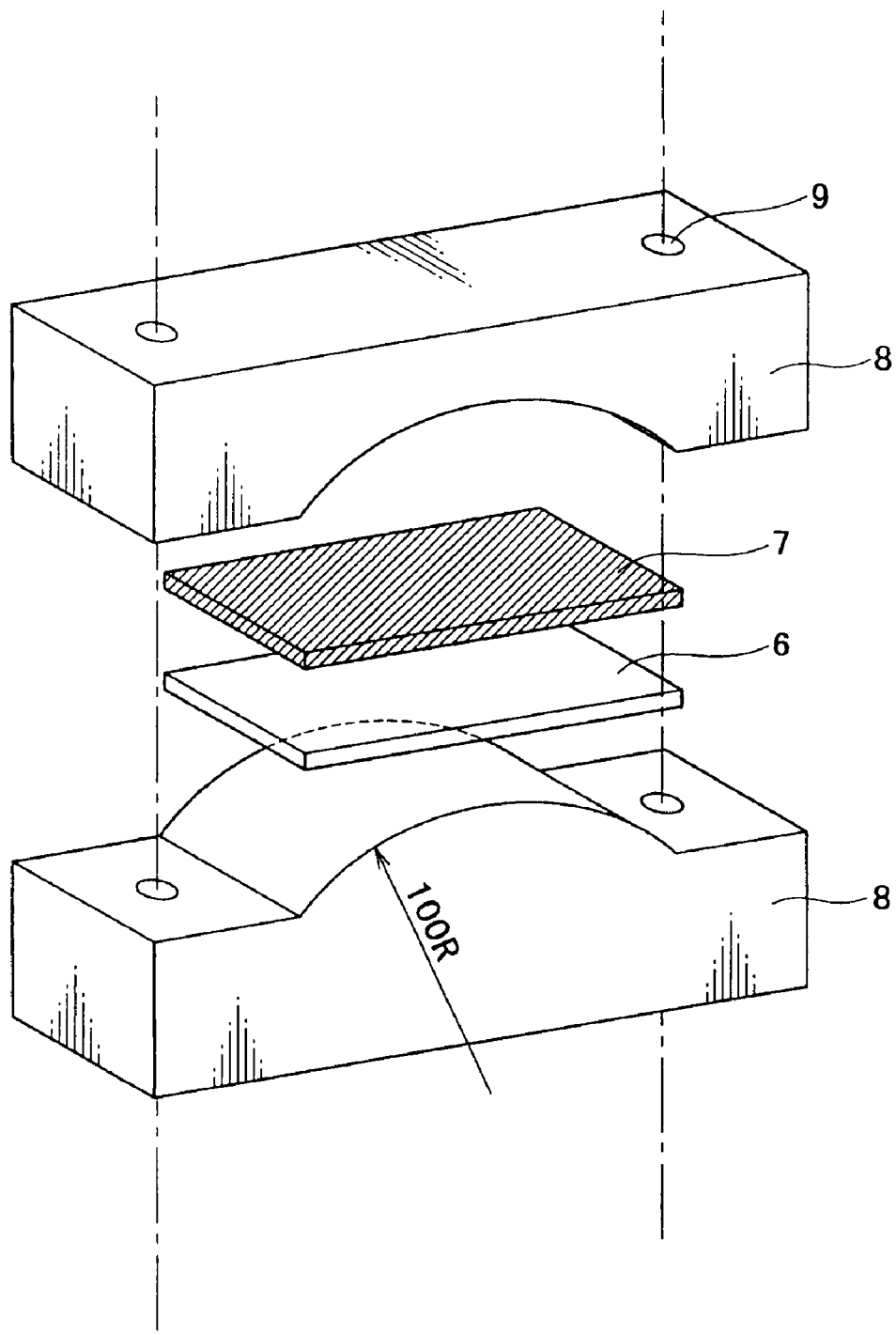
FIG. 4 is a perspective view illustrating a jig for use in a CBB test.

Subsequently, a test piece was taken from each of the overlay-welded weld joint test members, and subjected to the CBB test. More specifically, a region of the weld joint test member 11 indicated by the dotted line in FIG. 1 was cut out to obtain a CBB test piece 6. The CBB test piece 6 had a size of 2 mm thickness×10 mm width×50 mm length. FIG. 4 is a perspective view illustrating a jig to be used in the CBB test. Then, the CBB test piece 6 is set between a pair of holder members 8 together with graphite fiber wool 7 for forming a crevice in the CBB test piece 6, and inserting two clamping bolts into respective ones of two holes 9 on opposite sides of the set of holder members 8 to clamp the CBB test piece 6 between the holder members 8 so as to allow the CBB test piece 6 to have a curvature. As shown in FIG. 4, the holder members 8 comprise an upper holder member formed with a concave portion having a curvature radius of 100 mm, in a longitudinally central region thereof, and an upper holder member formed with a convex portion having a curvature radius of 100 mm, in an longitudinally central region thereof. Then, the CBB test piece 6 attached to the jig was immersed into high-temperature/high pressure water in an autoclave (oxygen saturation concentration: 8 wt ppm, 70 kgf/cm$^2$, 290° C.) for 500 hours. After the immersion, the CBB test piece 6 was detached from the jig, and a cracking state was evaluated based on observation of a cross-section of the CBB test piece 6 by the following criteria.

○: The maximum crack depth is less than 15 μm, and the CBB test was passed.

x: The maximum crack depth is equal to or greater than 15 μm, and the CBB test was not passed.

(Coriou Corrosion Test)

Each of the welding materials Nos. A to L was subjected to a Coriou corrosion test simulating an intergranular corrosion environment in a high-concentration nitric acid solution including a highly-acid metal ion, in the following manner. Each of the welding materials was immersed into 500 mL of 8N boiling nitric acid solution having 1.0 g/L of Cr$^{6+}$ ion added thereto. 4 batches of the immersion operations were performed while renewing the solution, wherein one batch was set to 24 hours. After completion of the 4 batches, the welding material was taken out of the solution, and a corrosion weight loss thereof was measured to evaluate a corrosion speed.

Table 2 illustrates results of the CBB test and the Coriou test. In Table 2, the raw of "NON" in the "Welding Material NO" represents a test result on a test piece (comparative example) in which the overlay weld of the welding material 1 is eliminated from the weld joint test member 11.

TABLE 2

| Welding Material No. | CBB Test Crack Depth | Coriou Test Corrosion Rate (g/m$^2$ · h) | Note |
|---|---|---|---|
| NON | x | 7.64 | Comparative Example |
| A | ○ | 1.25 | Inventive Example |
| B | ○ | 2.02 | Inventive Example |
| C | ○ | 2.41 | Inventive Example |
| D | x | 4.55 | Comparative Example |
| E | x | 3.83 | Comparative Example |

TABLE 2-continued

| Welding Material No. | CBB Test Crack Depth | Coriou Test Corrosion Rate (g/m$^2$ · h) | Note |
|---|---|---|---|
| F | x | 3.16 | Comparative Example |
| G | o | 2.37 | Inventive Example |
| H | o | 2.04 | Inventive Example |
| I | x | 4.79 | Comparative Example |
| J | x | 4.11 | Comparative Example |
| K | x | 4.44 | Comparative Example |
| L | x | 3.98 | Comparative Example |

As seen in Table 2, in cases where a heat-affected zone 5 (welded junction P) of a weld joint is overlay-welded with the welding material according to the present invention, such as the welding materials Nos. A to C, G and H (inventive examples), by, a stress corrosion cracking resistance and an intergranular corrosion resistance of the weld joint is significantly improved as compared with a weld joint devoid of the overlay weld on the heat-affected zone 5, even if an austenitic stainless steel member having a high C content as in SUS 304 is used as a base metal of piping constituting a weld, i.e., a base metal (plate members 2, 3) of the weld joint test member 11. It is also proven that, as compared with a weld joint in which the heat-affected zone 5 is overlay-welded with each of the welding materials Nos. D to F and I to L (comparative examples) other than the welding material according to the present invention, the weld joint in which the heat-affected zone 5 is overlay-welded with the welding material according to the present invention, exhibits excellent stress corrosion cracking resistance and intergranular corrosion resistance.

This shows that the use of the welding material according to the present invention as the welding material 1 (austenitic welding material) makes it possible to suppress intergranular corrosion in an overlay weld and sufficiently prevent stress corrosion cracking.

Further, based on comparison between respective results of the Coriou corrosion test using the welding material No. A as the welding material 1 and the Coriou corrosion test using the welding material No. H as the welding material 1, it is proven that the intergranular corrosion resistance is improved by setting the Ti content in the welding material to be equal to or greater than the total content of C, P, S, N and O in terms of Ti equivalent. This would be because, when the welding material No. H is used as the welding material 1, the above impurity elements causing intergranular corrosion are segregated in grain boundaries, whereas, when the welding material No. A is used as the welding material 1, the impurity elements are precipitated in a deposited metal in the form of Ti-based carbides and other compounds, such as TiC, FeTiP, TiS, TiN and TiO$_2$, so as to allow the impurity elements to become harmless.

As mentioned above in detail, according to one aspect of the present invention, there is provided an austenitic welding material which contains C: 0.01 wt % or less, Si: 0.5 wt % or less, Mn: 0.5 wt % or less, P: 0.005 wt % or less, S: 0.005 wt % or less, Ni: 15 to 40 wt %, Cr: 20 to 30 wt %, N: 0.01 wt % or less, O: 0.01 wt % or less, and the balance of Fe and inevitable impurities, wherein the content of B contained as one of the inevitable impurities in the welding material is 3 wt ppm or less, and the total content of C, P, S, N and O in the welding material is 0.02 wt % or less.

In the welding material (austenitic stainless steel welding material) of the present invention, the content of impurity elements segregated in grain boundaries to cause a decrease in grain boundary energy is low, and in particular the B content in the welding material is 3 wt ppm or less, so that it becomes possible to suppress intergranular corrosion in a weld metal formed by welding using the welding material (or a deposited metal formed by overlay welding), and sufficiently suppress stress corrosion cracking.

In addition, the C content is 0.01 wt % or less, so that it becomes possible to suppress precipitation of Cr-based carbides. The Si content is 0.5 wt % or less, so that it becomes possible to suppress the intergranular corrosion. The Mn content is 0.5 wt % or less, so that it becomes possible to suppress corrosion due to formation of δ-ferrite. The P content is 0.005 wt % or less, so that it becomes possible to suppress intergranular segregation of P so as to prevent deterioration in the intergranular corrosion resistance and stress corrosion cracking resistance. The S content is 0.005 wt % or less, so that it becomes possible to suppress formation of sulfides so as to prevent deterioration in the intergranular corrosion resistance and stress corrosion cracking resistance.

The Ni content is 15 wt % or more, so that it becomes possible to allow the welding material and a metal structure of a weld metal formed by welding using the welding material (and a deposited metal firmed by overlay welding using the welding material) to be stabilized in austenite so as to suppress the intergranular corrosion and stress corrosion cracking. Further, the Ni content is 40 wt % or less, so that it becomes possible to facilitate a reduction in cost. The Cr content is 20 wt % or more, so that it becomes possible to ensure a sufficient corrosion resistance of a weld metal formed by welding using the welding material (and a deposited metal firmed by overlay welding using the welding material), for example, under a high-temperature/high-pressure underwater environment undergoing neutron irradiation, as in a core of a light-water nuclear reactor, and under a transpassive corrosion environment between a boiling heat transfer surface and a high-concentration nitric acid solution including a highly-acid ion, as in a reprocessing plant. Further, the Cr content is 30 wt % or less, so that it becomes possible to suppress precipitation of a Cr-rich brittle phase.

Each of the N content and the O content is 0.01 wt % or less, and the sum of the C content, the P content, the S content, the N content and the O content is 0.02 wt % or less, so that it becomes possible to suppress a decrease in grain boundary energy due to segregation of these elements. Thus, a weld metal formed by welding using the welding material of the present invention (and a deposited metal firmed by overlay welding using the welding material) exhibits excellent intergranular corrosion resistance and stress corrosion cracking resistance.

The welding material of the present invention is an austenitic welding material having a low content of impurity elements. Thus, in welding using this welding material, a temperature rise of a base metal can be suppressed to a low level, so that it becomes possible to narrow a welding heat-affected zone, i.e., a sensitized zone. Further, solidification of a weld will be promptly completed, and a residual stress in a weld is placed in a compressive state, so that a welded junction exhibits excellent intergranular corrosion resistance and stress corrosion cracking resistance, as well as the weld metal and the deposited metal.

Thus, the welding material of the present invention can be used for welding of apparatus, piping or the like, for example, in a nuclear power plant, to effectively prevent the occurrence and development of stress corrosion cracking or the like in a weld metal and a welding heat-affected zone. Further, a welded junction of the apparatus, piping or the like can be overlay-welded with the welding material of the present invention, to effectively prevent the occurrence and development of stress corrosion cracking or the like in a weld metal and a welding heat-affected zone.

Preferably, the welding material of the present invention further contains Ti, and wherein Ti, C, P, S, N and O contents in the welding material satisfy the aforementioned formula (1).

According to this feature, it becomes possible to allow impurity elements causing the intergranular corrosion, such as C, P, S, N and O, to be precipitated in a deposited metal in the form of Ti-based carbides, Ti-based phosphides, Ti-based sulfides, Ti-based nitrides, Ti-based oxides and other Ti-based compounds, such as TiC, FeTiP, TiS, TiN and $TiO_2$, to render the impurity elements harmless to the stress corrosion cracking and intergranular corrosion, particularly to the intergranular corrosion.

According to another aspect of the present invention, there is provided a preventive maintenance method for stress corrosion cracking of a structure formed by welding austenitic stainless steel members together. The preventive maintenance method comprises an overlay welding step of overlay-welding the above welding material to a surface of a welding heat-affected zone of the structure to form an overlay weld thereon.

In the preventive maintenance method of the present invention, it becomes possible to effectively prevent the occurrence and development of stress corrosion cracking or the like in a heat-affected zone within a welded junction of a structure (e.g., welded junction of an austenitic stainless steel component or piping).

Preferably, the preventive maintenance method of the present invention further comprises a repair welding step of, before the overlay welding step, removing a defective portion existing in a welded junction and subjecting the removed portion to repair welding, and wherein the overlay welding in the overlay welding step is performed to allow the welded junction to be coated with the overlay weld.

According to this feature, it becomes possible to effectively prevent the occurrence and development of stress corrosion cracking or the like in the repair weld and a heat-affected zone caused by the repair welding.

According to a yet another aspect of the present invention, there is provided a preventive maintenance method for stress corrosion cracking of a structure formed by welding and joining at least a first austenitic stainless steel member and a second austenitic stainless steel member. The preventive maintenance method comprises the steps of: separating the second austenitic stainless steel member uses in the structure and to be replaced with a countermeasure member, from the first austenitic stainless steel member, and detaching the second austenitic stainless steel member from the structure; overlay-welding the above welding material to each of a groove surface of the countermeasure member and a groove surface of the first austenitic stainless steel member; and welding and joining the overlay-welded groove surface of the countermeasure member and the overlay-welded groove surface of the first austenitic stainless steel member.

In the preventive maintenance method of the present invention, before welding and joining the countermeasure member and the first austenitic stainless steel member, the welding material is overlay-welded to each of the groove surface of the countermeasure member and the groove surface of the first austenitic stainless steel member, so that it becomes possible to suppress sensitization in heat-affected zones of both of the countermeasure member and the first austenitic stainless steel member so as to effectively prevent the occurrence and development of stress corrosion cracking or the like.

According to a still another aspect of the present invention, there is provided a preventive maintenance method for intergranular corrosion of an austenitic stainless steel structure contactable with a corrosive fluid. The preventive maintenance method comprises a step of overlay-welding the above welding material to a surface of the structure contactable with the corrosive fluid, to form an overlay weld thereon so as to prevent the contact with the corrosive fluid.

In the preventive maintenance method of the present invention, the overlay weld keeps the corrosive fluid from coming into direct contact with a structure (e.g., welded junction of an austenitic stainless steel component or piping), so that it becomes possible to effectively prevent intergranular corrosion of the structure.

In the preventive maintenance of the present invention, the structure may be formed by welding austenitic stainless steel members together, wherein one of opposite surfaces of a welded junction of the structure is the surface contactable with the corrosive fluid.

According to this feature, the overlay weld keeps the corrosive fluid from coming into direct contact with the welded junction, so that it becomes possible to effectively prevent intergranular corrosion of the welded junction.

INDUSTRIAL APPLICABILITY

In a process of forming a welded structure, the austenitic welding material of the present invention is usable to improve a stress corrosion cracking resistance and an intergranular corrosion resistance in a weld metal and a heat-affected zone of the welded structure. More specifically, the austenitic welding material of the present invention is usable as a welding material for equipment, piping or the like, for example, in a nuclear power plant, to effectively prevent the occurrence and development of stress corrosion cracking or the like in a weld metal and a heat-affected zone. Further, the austenitic welding material of the present invention is usable in overlay welding for a welded junction of the welded structure, to further improve the stress corrosion cracking resistance and intergranular corrosion resistance in the weld metal and the heat-affected zone.

The stress-corrosion-cracking preventive maintenance method of the present invention is applicable to a welded structure to prevent stress corrosion cracking of the welded structure more reliably than ever before. The intergranular-corrosion preventive maintenance method of the present invention is applicable to a welded structure to prevent intergranular corrosion of the welded structure more reliably than ever before.

What is claimed is:

1. A preventive maintenance method for stress corrosion cracking of a structure formed by welding austenitic stainless steel members together to form a welded junction, comprising:

a repair welding step of removing a defective portion present at the welded junction of the structure, and subjecting a remaining portion to repair welding using a repair welding material, thereby forming a repair portion having a heat affected zone; and an overlay welding step, performed after the repair portion is formed, of overlay-welding an austenitic welding material to a surface of the structure, wherein the overlay welding step welds the austenitic welding material over the welded junction including the repair portion and its heat affected zone, wherein the austenitic welding material is different in composition from the repair welding material and has improved corrosion stress cracking resistance, and wherein the austenitic welding material contains C: 0.01 wt % or less, Si: 0.5 wt % or less, Mn: 0.5 wt % or less, P: 0.005 wt % or less, S: 0.005 wt % or less, Ni: 15 to 40 wt %, Cr: 20 to 30 wt %, N: 0.01 wt % or less, O: 0.01 wt % or less, and the balance of Fe and inevitable impurities, wherein the content of B contained as one of the inevitable impurities in the welding material is 3 wt ppm or less, and the total content of C, P, S, N and O in the welding material is 0.02 wt % or less.

2. A preventive maintenance method for stress corrosion cracking of a structure formed by welding and joining at least a first austenitic stainless steel member and a second austenitic stainless steel member, comprising:

separating the second austenitic stainless steel member used in the structure and to be replaced with a countermeasure member, from the first austenitic stainless steel member, and detaching the second austenitic stainless steel member from the structure;

overlay-welding an austenitic welding material to each of a groove surface of the countermeasure member and a groove surface of the first austenitic stainless steel member; and welding and joining the overlay-welded groove surface of the countermeasure member and the overlay-welded groove surface of the first austenitic stainless steel member, wherein the austenitic welding material contains C: 0.01 wt % or less, Si: 0.5 wt % or less, Mn: 0.5 wt % or less, P: 0.005 wt % or less, S: 0.005 wt % or less, Ni: 15 to 40 wt %, Cr: 20 to 30 wt %, N: 0.01 wt % or less, O: 0.01 wt % or less, and the balance of Fe and inevitable impurities, wherein the content of B contained as one of the inevitable impurities in the welding material is 3 wt ppm or less, and the total content of C, P, S, N and O in the welding material is 0.02 wt % or less.

3. The preventive maintenance method as defined in claim 1, wherein the welding material further contains Ti, and wherein Ti, C, P, S, N and O contents in the welding material satisfy the following formula (1):

$$[Ti] \geq (48/12) \times [C] + (48/31) \times [P] + (48/32) \times [S] + (48/14) \times [N] + (48/16) \times (1/2) \times [O] \quad (1)$$

(where [Ti], [C], [P], [S], [N] and [O] represent respective contents of Ti, C, P, S, N and O (wt %)).

4. The preventive maintenance method as defined in claim 2, wherein the welding material further contains Ti, and wherein Ti, C, P, S, N and O contents in the welding material satisfy the following formula (1):

$$[Ti] \geq (48/12) \times [C] + (48/31) \times [P] + (48/32) \times [S] + (48/14) \times [N] + (48/16) \times (1/2) \times [O] \quad (1)$$

(where [Ti], [C], [P], [S], [N] and [O] represent respective contents of Ti, C, P, S, N and O (wt %)).

* * * * *